(12) United States Patent
Gunnarsson et al.

(10) Patent No.: US 12,284,627 B2
(45) Date of Patent: Apr. 22, 2025

(54) RELATIVE POSITIONING ASSISTANCE INFORMATION

(71) Applicant: Telefonaktiebolaget LM Ericsson (publ), Stockholm (SE)

(72) Inventors: Fredrik Gunnarsson, Linköping (SE); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 198 days.

(21) Appl. No.: 17/788,871

(22) PCT Filed: Feb. 8, 2021

(86) PCT No.: PCT/SE2021/050088
§ 371 (c)(1),
(2) Date: Jun. 24, 2022

(87) PCT Pub. No.: WO2021/158165
PCT Pub. Date: Aug. 12, 2021

(65) Prior Publication Data
US 2023/0024368 A1 Jan. 26, 2023

Related U.S. Application Data

(60) Provisional application No. 62/971,604, filed on Feb. 7, 2020.

(51) Int. Cl.
*H04W 64/00* (2009.01)
*H04W 88/18* (2009.01)

(52) U.S. Cl.
CPC ........... *H04W 64/00* (2013.01); *H04W 88/18* (2013.01)

(58) Field of Classification Search
CPC ...... H04W 64/00; H04W 88/18; H04W 88/02
See application file for complete search history.

(56) References Cited

U.S. PATENT DOCUMENTS

| 2002/0089437 | A1 | 7/2002 | Le et al. |
| 2012/0184302 | A1 | 7/2012 | Kazmi et al. |

(Continued)

FOREIGN PATENT DOCUMENTS

| CN | 107251586 A | 10/2017 |
| CN | 109168174 A | 1/2019 |

(Continued)

OTHER PUBLICATIONS

"Summary of [AT109e][624][POS] Open issues on UE-based downlink positioning assistance data", 3GPP TSG-RAN WG2 Meeting #109-e, R2-2001949, Online, Feb. 24-Mar. 6, 2020, pp. 1-20.

(Continued)

*Primary Examiner* — Christopher M Brandt
(74) *Attorney, Agent, or Firm* — Murphy, Bilak & Homiller, PLLC

(57) ABSTRACT

Embodiments include methods, performed by a network node, for providing positioning assistance data to one or more user equipment (UEs) in a wireless network. Such methods include determining relative location information for one or more transmission reception points (TRPs) in the wireless network based on absolute location information for an associated TRP in the wireless network. Such methods also include transmitting, to one or more UEs, positioning assistance data including the relative location information for the one or more TRPs. Other embodiments include complementary methods for a UE, as well as network nodes and UEs configured to perform such methods.

19 Claims, 7 Drawing Sheets

(56) References Cited

U.S. PATENT DOCUMENTS

| | | |
|---|---|---|
| 2016/0255463 A1 | 9/2016 | Das et al. |
| 2018/0324738 A1 | 11/2018 | Stirling-Gallacher et al. |
| 2019/0369201 A1 | 12/2019 | Akkarakaran et al. |
| 2020/0053738 A1 | 2/2020 | Harada et al. |
| 2021/0058131 A1 | 2/2021 | Zhu et al. |

FOREIGN PATENT DOCUMENTS

| | | |
|---|---|---|
| TW | 202005308 A | 1/2020 |
| WO | 2018173232 A1 | 9/2018 |
| WO | 2018203820 A1 | 11/2018 |
| WO | 2019054908 A1 | 3/2019 |
| WO | 2019091584 A1 | 5/2019 |

OTHER PUBLICATIONS

"3GPP TS 23.501 V15.8.0", 3rd Generation Partnership Project; Technical Specification Group Services and System Aspects; System architecture for the 5G System (5GS); Stage 2 (Release 15), Dec. 2019, pp. 1-248.

"3GPP TS 33.501 V15.7.0", 3rd Generation Partnership Project; Technical Specification Group Services and System Aspects; Security architecture and procedures for 5G system (Release 15), Dec. 2019, pp. 1-191.

"3GPP TS 36.305 V15.4.0", 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15), Jun. 2019, pp. 1-91.

"3GPP TS 37.355 V15.0.0", 3rd Generation Partnership Project; Technical Specification Group Radio Access Network; LTE Positioning Protocol (LPP) (Release 15), Dec. 2019, pp. 1-224.

"Assistance Data for DL-only UE-based mode", 3GPP TSG-RAN WG2 Meeting #108, R2-1915563, Reno, Nevada, Revision of R2-1913399, Nov. 18-22, 2019, pp. 1-14.

"3GPP TS 38.305 V15.4.0", 3rd Generation Partnership Project; Technical Specification Group Radio Access Network; NG Radio Access Network (NG-RAN); Stage 2 functional specification of User Equipment (UE) positioning in NG-RAN (Release 15), Jun. 2019, pp. 1-72.

"3GPP TR 38.901 V16.1.0", 3rd Generation Partnership Project; Technical Specification Group Radio Access Network; Study on channel model for frequencies from 0.5 to 100 GHZ (Release 16), Dec. 2019, pp. 1-101.

"Important LPP structural aspects", 3GPP TSG-RAN WG2 109-bis, R2-2003144, Electronic Meeting, Apr. 20-Apr. 30, 2020, pp. 1-24.

"NR RAT-dependent DL Positioning", 3GPP TSG RAN WG1 Ad-Hoc Meeting 1901, R1-1900310, Taipei, Jan. 21-25, 2019, pp. 1-19.

"Report on Structure of UE-based assistance data (Email discussion 949)", 3GPP TSG-RAN WG2 Meeting #110-e, R2-2004700, Online, Jun. 1-12, 2020, pp. 1-11.

"Structure of UE-based beam information assistance data (Extension to email discussion 949)", 3GPP TSG-RAN WG2 #110e, R2-20xxxxx, Online, Jun. 1-12, 2020, Jun. 1-12, 2020, pp. 1-4.

"Summary and Text Proposal on Structure of UE-based assistance data (Email discussion 949)", 3GPP TSG-RAN WG2 #110e, R2-2004705, Online, Jun. 1-12, 2020, pp. 1-10.

"Summary of (108#89][NR/Pos] UE-based downlink positioning assistance data-", 3GPP TSG-RAN WG2 Meeting #109, R2-2001234, Athens, Greece, Feb. 24-28, 2019, pp. 1-38.

"Resolution of Remaining Opens for NR Positioning DL PRS Design", 3GPP TSG RAN WG1 Meeting#99, R1-1912228, Reno, USA, Nov. 18-22, 2019, pp. 1-26.

"Status Report to TSG", 3GPP TSG RANmeeting #86, RP-192580 (same as RP-193201), Sitges, Spain, Dec. 9-12, 2019, pp. 1-32.

Wei, et al., "Application of High Resolution Multibeam System in Reservoir Storage Capacity Survey", Zhejiang Hydrotechnics, No. 2 Total No. 210, Mar. 2017, pp. 89-91, English abstract attached.

FIG. 7A

```
NR-TRP-InfoElement-r16 ::= SEQUENCE {
    nr-TRP-ID-r16                       INTEGER (0..255),
    nr-PRS-ResourceSetList-r16          SEQUENCE (SIZE (1..nrMaxResourceSets)) NR-PRS-ResourceSet-r16,
    nr-PRS-SFN0-Offset-r16              INTEGER (-512..511),
    nr-PRS-expectedRSTD-r16             INTEGER (-3841..3841)       OPTIONAL,   -- Cond NotRefTRP
    nr-PRS-expectedRSTD-uncerainty-r16  INTEGER (-246..246)         OPTIONAL,   -- Cond NotRefTRP
    nrPhysCellId-r16                    INTEGER (0..1007)           OPTIONAL,
    nrCellGlobalID-r16                  NCGI-r15                    OPTIONAL,
    nrARFCN-r16                         ARFCN-ValueNR               OPTIONAL,
    nr-TRP-StaticInfo-r16               NR-TRP-StaticInfo-r16       OPTIONAL,   -- Cond UEBased
    nr-TRP-DynamicInfo-r16              NR-TRP-DynamicInfo-r16      OPTIONAL,   -- Cond UEBased
    ...
}
```

FIG. 7B

```
-- ASN1START
NR-TRP-StaticInfo-r16 ::= SEQUENCE {
    nr-TRP-locationInfo-r16   NR-TRP-LocationInfo-r16    OPTIONAL,   -- Cond
    nr-prsBeamInfo-r16        NR-PRS-BeamInfo-r16        OPTIONAL,   -- Cond AoDsupport
    ...
}
-- ASN1STOP
```

FIG. 7C

```
-- ASN1START
NR-TRP-DynamicInfo-r16 ::= SEQUENCE {
    nr-rtdInfo-r16        NR-RTD-Info-r16        OPTIONAL,   -- Need ON
    ...
}
-- ASN1STOP
```

FIG. 8

```
-- ASN1START
NR-TRP-StaticInfo-r16 ::= SEQUENCE {
    nr-associatedTRP-ID-r16   NR-TRP-ID-r16              OPTIONAL,
    nr-TRP-locationInfo-r16   NR-TRP-LocationInfo-r16    OPTIONAL,   -- Cond Absolute
    nr-prsBeamInfo-r16        NR-PRS-BeamInfo-r16        OPTIONAL,   -- Cond AoDsupport
    ...
}
-- ASN1STOP
```

```
-- ASN1START
NR-TRP-StaticInfo-r16 ::= SEQUENCE {
    nr-associatedTRP-ID-r16    NR-TRP-ID-r16              OPTIONAL,
    nr-TRP-locationInfo-r16    NR-TRP-LocationInfo-r16,
                                              OPTIONAL,  -- Cond Absolute
    nr-prsBeamInfo-r16         NR-PRS-BeamInfo-r16
                                              OPTIONAL,  -- Cond AoDsupport
    ...
}

NR-TRP-LocationInfo-r16 ::= CHOICE {
    nr-TRP-absLocationInfo-r16    NR-TRP-absLocationInfo-r16,
    nr-TRP-relLocationInfo-r16    NR-TRP-relLocationInfo-r16,
}
-- ASN1STOP
```

RELATIVE POSITIONING ASSISTANCE INFORMATION

TECHNICAL FIELD

Embodiments of the present disclosure generally relate to wireless communication networks, and particularly relates to assisting wireless devices to determine their own positions based on information provided by a wireless network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of Long Term Evolution (LTE) technology is provided for context since it shares many features with NR.

LTE is an umbrella term for fourth generation (4G) radio access technologies (RATs) developed within 3GPP and initially standardized in Releases 8 and 9, also known as Evolved UTRAN (E-UTRAN). LTE is available in various frequency bands and is accompanied by improvements to non-radio aspects referred to as System Architecture Evolution (SAE), including the Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMES 134 and 138 via respective S6a interfaces.

In some embodiments, HSS 131 can communicate with a user data repository (UDR)—labeled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

The multiple access scheme for the LTE PHY is based on Orthogonal Frequency Division Multiplexing (OFDM) with a cyclic prefix (CP) in the downlink (DL), and on Single-Carrier Frequency Division Multiple Access (SC-FDMA) with a cyclic prefix in the uplink (UL). To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 0.5-ms slots. A 1-ms subframe includes two consecutive slots, each of which includes $N^{DL}_{symb}$ OFDM symbols comprised of $N_{sc}$ OFDM subcarriers. Similarly, each UL slot consists of $N^{UL}_{symb}$ OFDM symbols, each of which includes $N_{sc}$ OFDM subcarriers. A combination of a particular subcarrier in a particular symbol is known as a resource element (RE).

The LTE PHY maps various DL and UL physical channels to the resources described above. In general, a physical channel corresponds to a set of REs carrying information that originates from higher layers. Within the LTE DL and UL, certain REs within each LTE subframe are reserved for the transmission of reference signals. DL demodulation reference signals (DM-RS) are transmitted to aid the UE in the reception of an associated physical channel (e.g., PDCCH or PDSCH). Other DL reference signals include cell-specific reference signals (CRS), positioning reference signals (PRS), and CSI reference signals (CSI-RS). Other RS-like DL signals include Primary Synchronization Sequence (PSS) and Secondary Synchronization Sequence (SSS), which facilitate the UEs time and frequency synchronization and acquisition of system parameters (e.g., via PBCH). UL reference signals include DM-RS that are transmitted to aid the eNB in the reception of an associated physical channel (e.g., PUCCH or PUSCH); and sounding reference signals (SRS), which are not associated with any uplink channel.

3GPP standards provide various ways for positioning (e.g., determining the position of, locating, and/or determining the location of) UEs operating in LTE networks. In general, an LTE positioning node (referred to as "E-SMLC" or "location server") configures the target device (e.g., UE), an eNB, or a radio network node dedicated for positioning measurements (e.g., a "location measurement unit" or "LMU") to perform one or more positioning measurements according to one or more positioning methods. For example, the positioning measurements can include timing (and/or timing difference) measurements on UE, network, and/or satellite transmissions. The positioning measurements are used by the target device, the measuring node, and/or the positioning node to determine the location of the target device.

5G/NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, NR DL and UL time-domain physical resources are organized into subframes, slots, and OFDM-based symbols. NR also uses many of the same physical channels as LTE. Additionally, the NR RRC layer includes RRC_IDLE and RRC_CONNECTED states, but adds an additional state known as RRC_INACTIVE, which has some properties similar to a "suspended" condition used in LTE. In addition to providing coverage via cells, as in LTE, NR networks also provide coverage via "beams." In general, a DL "beam" is a coverage area of a network-transmitted RS that may be measured or monitored by a UE.

UE positioning is also expected to be an important feature for NR, which may include additional UE positioning use cases, scenarios, and/or applications. It is also expected the UE-based positioning will become more important for these new use cases, scenarios, and/or applications. In general, UE-based positioning refers to techniques in which the UE estimates its own position using one or more types of measurements based on assistance data provided by the network. However, the amount of assistance data needed to support UE-based positioning can be relatively large in some situations, such that delivering it in a timely manner via available network resources can be very costly and/or difficult. Accordingly, better techniques for provisioning assistance data are needed.

SUMMARY

Embodiments of the present disclosure provide specific improvements to positioning (e.g., determining the location) of user equipment (UEs) operating in a wireless network, such as by facilitating solutions to overcome exemplary problems summarized above and described in more detail below.

Some embodiments include methods (e.g., procedures) for providing positioning assistance data to one or more UEs in a wireless network. These exemplary methods can be performed by a network node or function (e.g., E-SMLC, SLP, LMF, base station, eNB, gNB, ng-eNB, etc., or component thereof) in or associated with the wireless network.

These exemplary methods can include determining relative location information for one or more TRPs based on absolute location information for an associated (or reference) TRP. These exemplary methods can also include transmitting, to one or more UEs, positioning assistance data including the relative location information for the one or more TRPs. In some embodiments, the positioning assistance data can also include the absolute location information for the associated TRP.

In some embodiments, the relative configuration information for the one or more TRPs can include an identifier of the associated TRP. In such embodiments, the identifier (indicates that the absolute configuration information for the one or more TRPs is adopted from (e.g., the same as) the absolute location information for the associated TRP.

In other of these embodiments, the determining operations can include determining respective differences (e.g., offsets) between an absolute location of the associated TRP and respective absolute locations of the one or more TRPs. In such embodiments, the relative location information can include the determined differences and an identifier of the associated TRP.

In some embodiments, these exemplary methods can also include selecting a relative configuration format, for the one or more TRPs, from a plurality of available relative configuration formats. In such embodiments, determining the relative configuration information can be based on the preferred relative configuration format. Furthermore, the transmitted positioning assistance data can include an indicator of the selected relative configuration format. In some of these embodiments, the available relative configuration formats can include a referential format based on an identifier of an associated TRP, and a differential format based on the identifier of the associated TRP and differences of one or more configuration parameters from reference parameters of the associated TRP.

In various embodiments, the transmitting operations can include transmitting the positioning assistance data to a single UE via unicast or broadcasting, via another network node, the positioning assistance data in at least one cell of the wireless network.

In some embodiments, these exemplary methods can also include receiving, from a UE, an indication of whether the UE supports relative TRP configuration information. In such embodiments, the positioning assistance data transmitted to the UE can include the relative location information for the one or more TRPs only when the indication indicates that the UE supports relative TRP configuration information. In some embodiments, the positioning assistance data transmitted to the UE can include absolute location information for the one or more TRPs when the indication indicates that the UE does not support relative TRP configuration information.

In some embodiments, these exemplary methods can also include receiving, from one of the UEs, an estimated position of the UE. The estimated position can be based on the relative location information for the one or more TRPs (e.g., in the positioning assistance data), which was determined based on the absolute location information for the associated TRP.

Other embodiments include methods (e.g., procedures) for positioning in a wireless network. These exemplary methods can be performed by a UE (e.g., wireless device, MTC device, NB-IoT device, modem, etc. or component thereof).

These exemplary methods can include receiving, from a network node (e.g., E-SMLC, LMF, etc.), positioning assistance data including relative location information for one or more TRPs in the wireless network. These exemplary methods can also include determining absolute location information for the one or more TRPs based on the relative location information and absolute location information for an associated (e.g., reference) TRP in the wireless network. These exemplary methods can also include estimating the UE's position based on the determined absolute location information and measurements of signals transmitted or received by the one or more TRPs.

In some embodiments, the relative configuration information for the one or more TRPs can include an identifier of the associated TRP. In such embodiments, the identifier indicates that the absolute configuration information for the one or more TRPs is adopted from (e.g., the same as) the absolute location information for the associated TRP. In such embodiments, determining the absolute location information for the one or more TRPs can include selecting the absolute location information for the associated TRP.

In other of these embodiments, the identifier indicates that the absolute location information for the one or more TRPs is differential to the absolute location information for the associated TRP. In such embodiments, the relative location information can include respective differences (e.g., offsets) between an absolute location of the associated TRP and respective absolute locations of the one or more TRPs. In such embodiments, determining the absolute location information for the one or more TRPs can include combining the respective differences with the absolute location information for the associated TRP.

In some embodiments, the positioning assistance data can also include an indicator of a relative configuration format for the relative location information. In such embodiments, determining the absolute location information can be based on the indicated relative configuration format. For example, the indicated relative configuration format can be one of a plurality of available relative configuration formats that include a referential format based on an identifier of an associated TRP, and a differential format based on the identifier of the associated TRP and differences of one or more configuration parameters from reference parameters of the associated TRP.

In various embodiments, the positioning assistance data can be received as unicast from the network node, or as broadcast in a cell of the wireless network.

In some embodiments, these exemplary methods can also include transmitting, to the network node, an indication of whether the UE supports relative TRP configuration information. In such embodiments, the received positioning assistance can include the relative location information for the one or more TRPs only when the indication indicates that the UE supports relative TRP configuration information. In some embodiments, the received positioning assistance data can include absolute location information for the one or more TRPs when the indication indicates that the UE does not support relative TRP configuration information.

In some embodiments, these exemplary methods can also include transmitting the estimated UE position to the network node.

Other embodiments include network nodes or functions (e.g., E-SMLCs, LMFs, base stations, etc.) and UEs (e.g., wireless devices, IoT devices, or components thereof, such as a modem) configured to perform operations corresponding to any of the exemplary methods described herein. Other embodiments include non-transitory, computer-readable media storing program instructions that, when executed by processing circuitry, configure such network nodes and UEs to perform operations corresponding to various exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 7, which includes FIGS. 7A-7C, shows various ASN.1 data structures for positioning assistance information, according to various exemplary embodiments of the present disclosure.

FIGS. 8-9 show additional ASN.1 data structures for positioning assistance information, according to various exemplary embodiments of the present disclosure.

FIG. 10 is a flow diagram of an exemplary method (e.g., procedure) for a network node or function (e.g., E-SMLC, LMF, etc.), according to various exemplary embodiments of the present disclosure.

DETAILED DESCRIPTION

Figure 1:
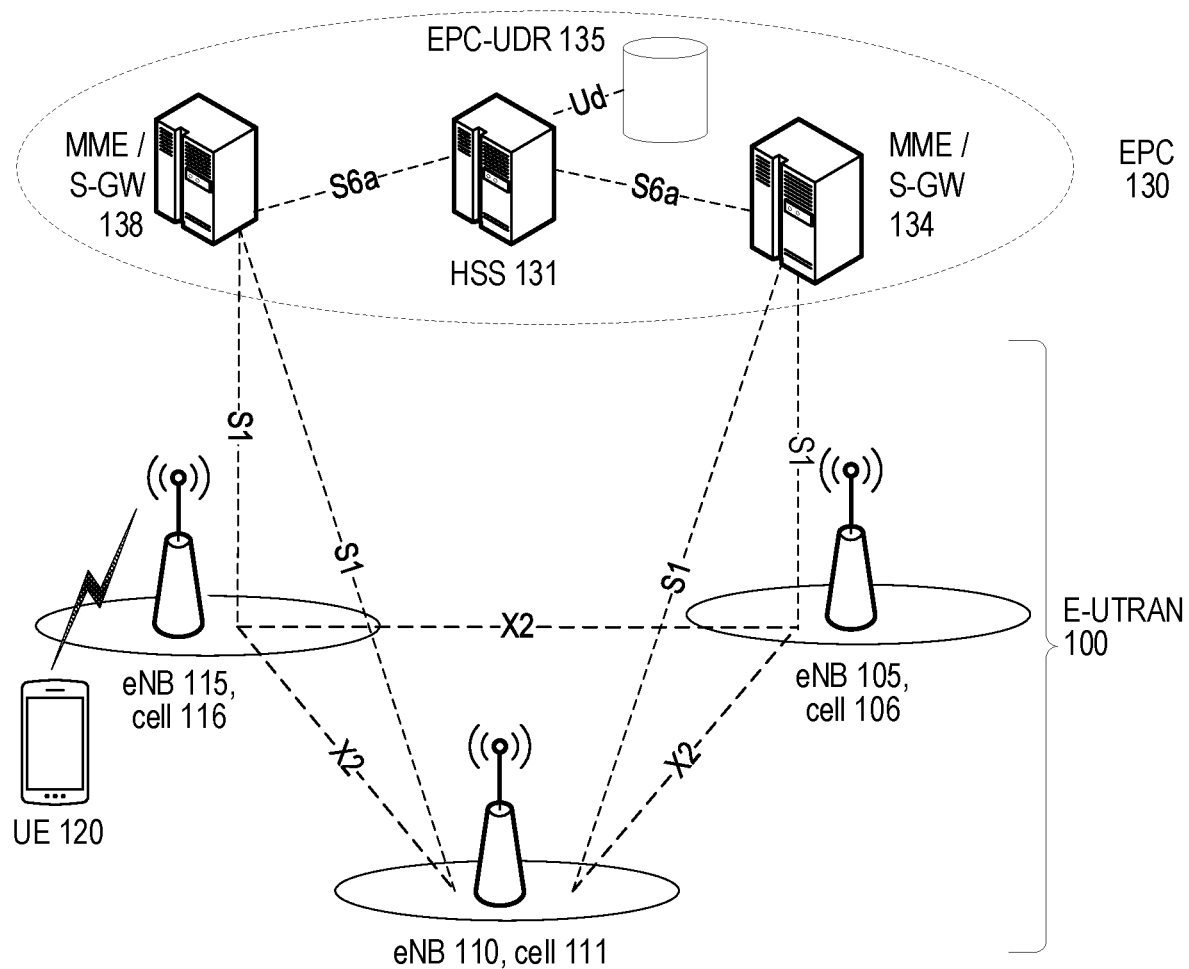
FIG. 1 is a high-level illustration of an exemplary architecture of the Long-Term Evolution (LTE) Evolved UTRAN (E-UTRAN) and Evolved Packet Core (EPC) network.
Figure 2:
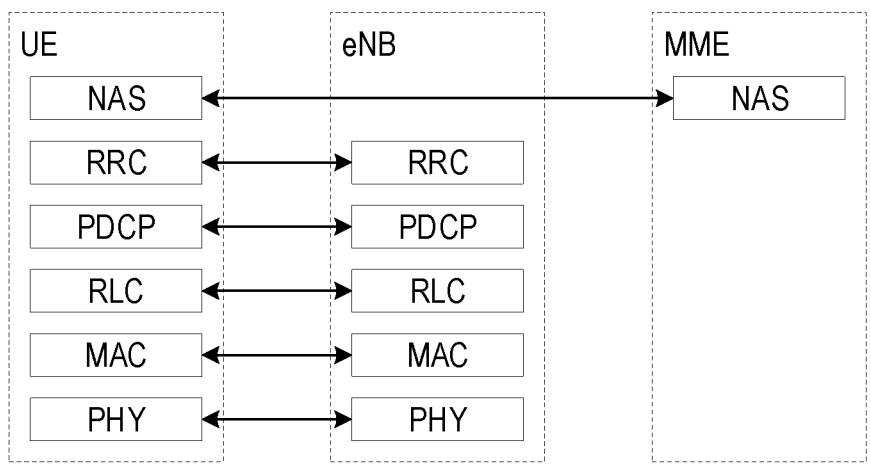
FIG. 2 shows exemplary control-plane (CP) protocol layers of the radio interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms may be used in the description given below:
  Radio Node: As used herein, a "radio node" can be either a "radio access node" or a "wireless device."
  Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point (TP), a transmission reception point (TRP), a remote radio unit (RRU or RRH), and a relay node.
  Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), a location management function (LMF), or the like.
  Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.
  Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.
  Base station: As used herein, a "base station" may comprise a physical or a logical node transmitting or controlling the transmission of radio signals, e.g., eNB, gNB, ng-eNB, en-gNB, centralized unit (CU)/distributed unit (DU), transmitting radio network node, transmission point (TP), transmission reception point (TRP), remote radio head (RRH), remote radio unit (RRU), Distributed Antenna System (DAS), relay, etc.
  Channel: As used herein, unless otherwise noted, a "channel" can refer to a logical, transport, or physical channel. A channel may comprise and/or be arranged on one or more carriers, e.g., a plurality of subcarriers. A channel carrying—and/or for carrying—control signaling/control information may be considered a control channel, in particular if it is a physical layer channel and/or if it carries control plane information. Analogously, a channel carrying—and/or for carrying—data signaling/user information may be considered a data channel, in particular if it is a physical layer channel and/or if it carries user plane (UP) information. A channel may be defined for a specific communication direction, or for two complementary communication directions (e.g., UL and DL, or sidelink in two directions), in which case it may be considered to have two directional channels.

Location server: As used herein, "location server" can refer to a network node with positioning functionality, e.g., ability to provide assistance data and/or request positioning measurements and/or calculate a location based on positioning measurements. A location server may or may not be part of a base station.

Positioning signals: As used herein, "positioning signals" may include any signal or channel to be received by the UE for performing a positioning measurement such as a DL reference signal, PRS, SSB, synchronization signal, DM-RS, CSI-RS, etc.

Positioning measurements: As used herein, "positioning measurements" may include timing measurements (e.g., time difference of arrival, TDOA, RSTD, time of arrival, TOA, Rx-Tx, RTT, etc.), power-based measurements (e.g., RSRP, RSRQ, SINR, etc.), and/or identifier detection/measurement (e.g., cell ID, beam ID, etc.) that are configured for a positioning method (e.g., OTDOA, E-CID, etc.). UE positioning measurements may be reported to a network node or may be used for positioning purposes by the UE.

Positioning beam: As used herein, a "positioning beam" can include any beam carrying at least one positioning signal and/or that is used for a positioning purpose such as for measurements supporting one or more positioning methods (e.g., OTDOA, AOA, etc.). A positioning beam can have its own explicit identity or can be identified through an index associated with a specific signal that the beam carries.

The above definitions are not meant to be exclusive. In other words, various ones of the above terms may be explained and/or described elsewhere in the present disclosure using the same or similar terminology. Nevertheless, to the extent that such other explanations and/or descriptions conflict with the above definitions, the above definitions should control.

Furthermore, the term "beam" is used herein in relation to a cell (or UE) that is employing "beamforming." As such, the terms "beamforming configuration" and "beam configuration" are used interchangeably. "Beamforming" can include any of the following arrangements: a cell consisting of or comprising multiple beams; transmitting two or more SSBs in a single cell from the same location; using analog, digital, or hybrid beamforming (as described below) in the transmitting node; transmitting different signals in two or more different directions in the same cell from the same location; transmitting signals from different transmitter branches (comprising one or more antenna elements); transmitting in mmW frequency range (e.g., FR2 or above 6 GHz) in which beams are needed to overcome increased path loss.

In some cases, a beam may be associated with a reference signal ID, such as SSB ID on a carrier where SSBs are present, or other signal ID (e.g., DM-RS ID or CSI-RS ID) on carriers where SSBs are not transmitted but the other signals (e.g., DM-RS or CSI-RS) are used to differentiate beams. Furthermore, a positioning signal may be associated with a beam via a co-location or quasi-colocation property with respect to a signal characterizing the beam, e.g., co-located or quasi-collocated with the corresponding SSB and/or CSI-RS.

Unless otherwise noted, functions described herein as being performed by a UE, network node, radio network node, etc. can be distributed over a plurality of devices and/or network nodes. In other words, it is contemplated that the functions of the network node and UE described herein are not limited to performance by a single physical device and, in fact, can be distributed among several physical devices.

Although terminology from particular wireless systems (e.g., LTE and/or NR) may be used herein, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

As briefly mentioned above, the amount of assistance data needed to support UE-based positioning can be relatively large in some situations, such that delivering it in a timely manner via available network resources can be very costly and/or difficult. Accordingly, better techniques for provisioning assistance data are needed. These issues are discussed in more detail below.

Figure 3:
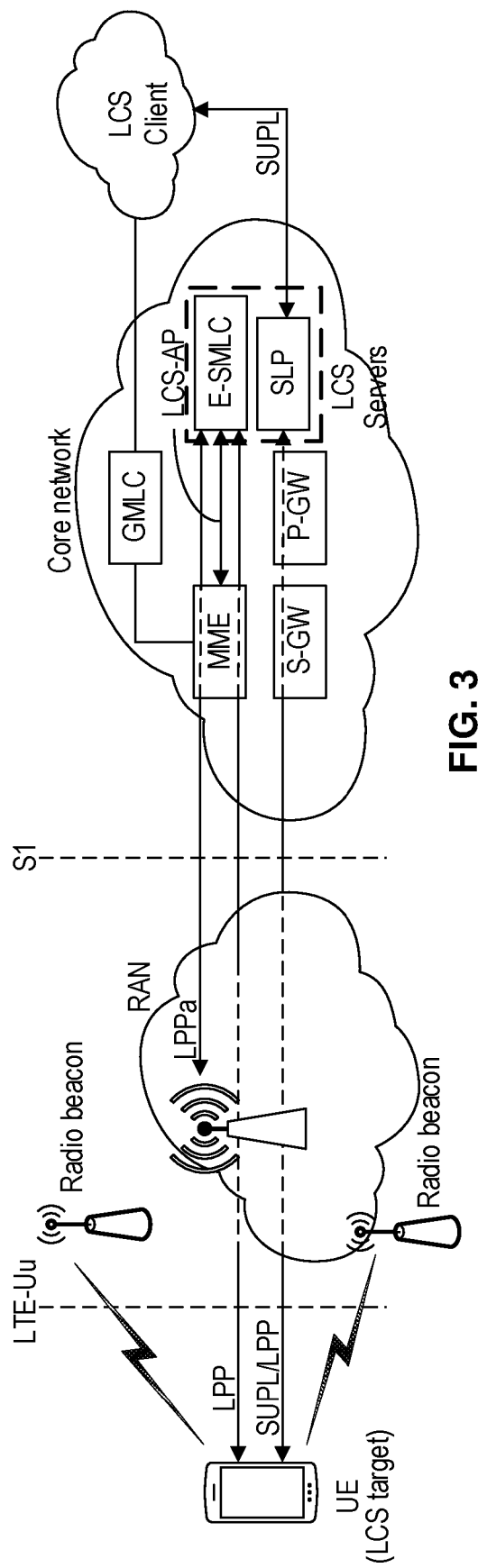
FIGS. 3-4 show two views of an exemplary positioning architecture for an LTE network.

FIG. 3 shows an exemplary positioning architecture within an LTE network. Three important functional elements of the LTE positioning architecture are the LCS Client, the LCS target and the LCS Server. The LCS Server is a physical or logical entity (e.g., as embodied by the E-SMLC or SLP in FIG. 3) managing positioning for an LCS target (e.g., as embodiments by the UE in FIG. 3) by collecting measurements and other location information, assisting the terminal in measurements when necessary, and estimating the LCS target location. An LCS Client is a software and/or hardware entity that interacts with an LCS Server for the purpose of obtaining location information for one or more LCS targets (i.e., the entities being positioned) such as the UE in FIG. 3. LCS Clients may also reside in the LCS targets themselves. An LCS Client sends a request to an LCS Server to obtain location information, and the LCS Server processes and serves the received requests and sends the positioning result and optionally a velocity estimate to the LCS Client. A positioning request can be originated from the terminal or a network node or external client.

In the LTE architecture shown in FIG. 3, position calculation can be conducted, for example, by the LCS Server (e.g., E-SMLC or SLP) or by the LCS target (e.g., a UE). The former approach corresponds to the UE-assisted positioning mode when it is based on UE measurements, whilst the latter corresponds to the UE-based positioning mode. The following positioning methods are supported in LTE:

Enhanced Cell ID (E-CID). Utilizes information to associate the UE with the geographical area of a serving cell, and then additional information to determine a finer granularity position. The following measurements are supported for E-CID: AoA (base station only), UE Rx-Tx time difference, timing advance (TA) types 1 and 2, reference signal received power (RSRP), and reference signal received quality (RSRQ).

Assisted GNSS. GNSS information retrieved by the UE, supported by assistance information provided to the UE from the E-SMLC.

OTDOA (Observed Time Difference of Arrival). The UE receives and measures Global Navigation Satellite System (GNSS) signals, supported by assistance information provided to the UE from E-SMLC.

UTDOA (Uplink TDOA). The UE is requested to transmit a specific waveform that is detected by multiple location measurement units (LMUs, which may be standalone, co-located or integrated into an eNB) at known positions. These measurements are forwarded to the E-SMLC for multilateration.

In addition, one or more of the following positioning modes can be utilized in each of the positioning methods listed above:

UE-Assisted: The UE performs measurements with or without assistance from the network and sends these measurements to the E-SMLC where the position calculation may take place.

UE-Based: The UE performs measurements and calculates its own position with assistance from the network.

Standalone: The UE performs measurements and calculates its own position without network assistance.

The detailed assistance data may include information about network node locations, beam directions etc. The assistance data can be provided to the UE via unicast or via broadcast.

Figure 4:
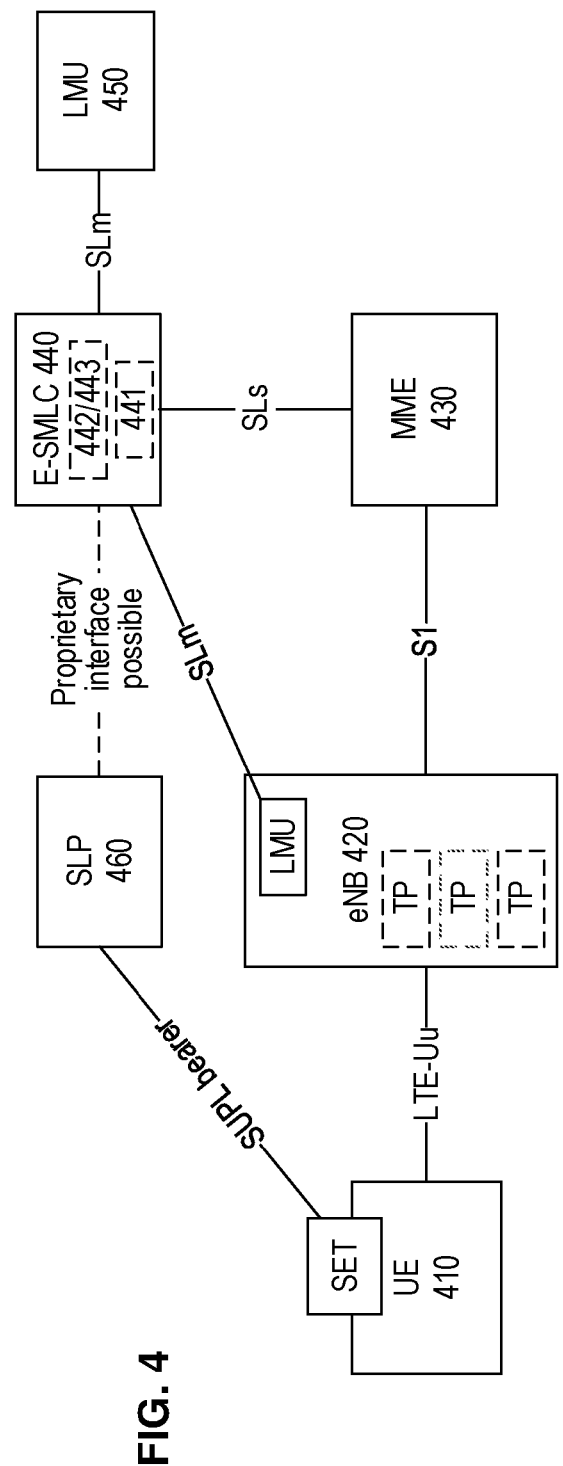

FIG. 4 shows another view of an exemplary positioning architecture in an LTE network. For example, FIG. 4 illustrates how secure user plane location (SUPL) techniques can be supported in LTE networks. In general, SUPL is run on top of the generic LTE user-plane protocol stack. The SUPL solution includes a location server—known as SUPL location platform, SLP (460)—that communicates with a SUPL-enabled terminal (SET), which can be software and/or hardware components of a UE. The SLP also may have a proprietary interface to the E-SMLC (440), which is the location server for control-plane positioning in LTE.

The E-SMLC can communicate with location measurement units (LMUs) via SLm interfaces. As shown in FIG. 4, LMUs can be standalone (e.g., LMU 450) or integrated with an eNB 420. An eNB also may include, or be associated with, one or more transmission points (TPs). The E-SMLC communicates to UEs (e.g., UE 410) via the serving MME (430) and eNB, using the respective SLs, S1, and Uu interfaces shown in FIG. 4. Although not shown, the RRC protocol is used to carry positioning-related information (e.g., to/from E-SMLC) between the UE and the eNB.

E-SMLC 440 can also include, or be associated with, various processing circuitry 442, by which the E-SMLC performs various operations described herein. Processing circuitry 442 can include similar types of processing circuitry as described herein in relation to other network nodes (see, e.g., description of FIG. 13). E-SMLC 440 can also include, or be associated with, a non-transitory computer-readable medium 443 storing instructions (also referred to as a computer program program) that can facilitate the operations of processing circuitry 442. Medium 443 can include similar types of computer memory as described herein in relation to other network nodes (see, e.g., description of FIG. 13). Additionally, E-SMLC 440 can include various communication interface circuitry 441, which can be used, e.g., for communication via the SLs interface. For example, communication interface circuitry 441 can be similar to other interface circuitry described herein in relation to other network nodes (see, e.g., description of FIG. 13).

Figure 5:
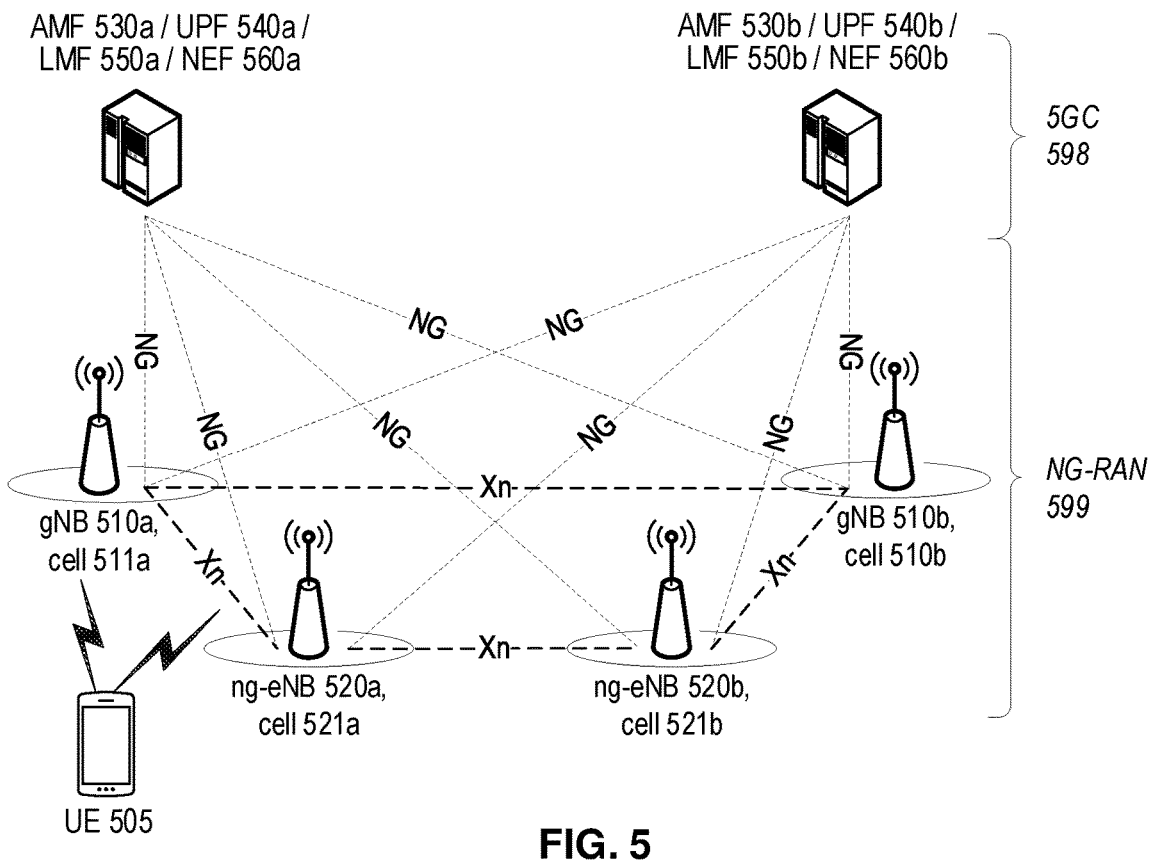
FIG. 5 illustrates a high-level view of a 5G/NR network architecture.

As mentioned above, positioning is also expected to be an important application in 5G/NR networks. FIG. 5 shows a high-level view of an exemplary 5G network architecture, including a Next Generation Radio Access Network (NG-RAN) 599 and a 5G Core (5GC) 598. As shown in the figure, NG-RAN 599 can include gNBs 510 (e.g., 510a,b) and ng-eNBs 520 (e.g., 520a,b) that are interconnected with each other via respective Xn interfaces. The gNBs and ng-eNBs are also connected via the NG interfaces to 5GC 598, more specifically to the AMF (Access and Mobility Management Function) 530 (e.g., AMFs 530a,b) via respective NG-C interfaces and to the UPF (User Plane Function) 540 (e.g., UPFs 540a,b) via respective NG-U interfaces. In some embodiments, 5GC 598 can also include one or more Location Management Functions (LMFs, e.g., LMF 550a, b), which are described in more detail below.

NG-RAN 599 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP can be applied, as defined in 3GPP TS 33.501.

Each of the gNBs 510a,b can support the NR radio interface, including frequency division duplexing (FDD), time division duplexing (TDD), or a combination thereof. In contrast, each of ng-eNBs 520a,b supports the LTE radio interface but, unlike conventional LTE eNBs (e.g., eNBs 105-115 shown in FIG. 1), connect to the 5GC via the NG interface.

Each of the gNBs and ng-eNBs can serve a geographic coverage area including one more cells, including exemplary cells 511a-b and 521a-b shown in FIG. 5. Depending on the particular cell in which it is located, a UE 505 can communicate with the gNB or ng-eNB serving that particular cell via the NR or LTE radio interface, respectively. In addition, the gNBs 510a,b and ng-eNBs 520a,b can provide various types of multi-RAT (radio access technology) dual connectivity (MR-DC) to UEs.

The gNBs and ng-eNBs can also use various directional beams to provide coverage in the respective cells. In general, a DL "beam" is a coverage area of a network-transmitted reference signal (RS) that may be measured or monitored by a UE. In NR, for example, such RS can include any of the following, alone or in combination: synchronization signal/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

Each of the gNBs 510a,b can include a central (or centralized) unit (CU or gNB-CU) and one or more distributed (or decentralized) units (DU or gNB-DU). A CU connects to DUs over respective F1 logical interfaces. The CU and connected DUs are only visible to other gNBs and the 5GC as a gNB, e.g., the F1 interface is not visible beyond gNB-CU. Each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

CUs can host higher-layer protocols and perform various gNB functions such controlling the operation of DUs. For example, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and RRC. Likewise, DUs can host lower-layer protocols and can include various subsets of the gNB functions, depending on the functional split. For example, a DU can host lower-layer protocols such as RLC, MAC, and PHY.

Figure 6:
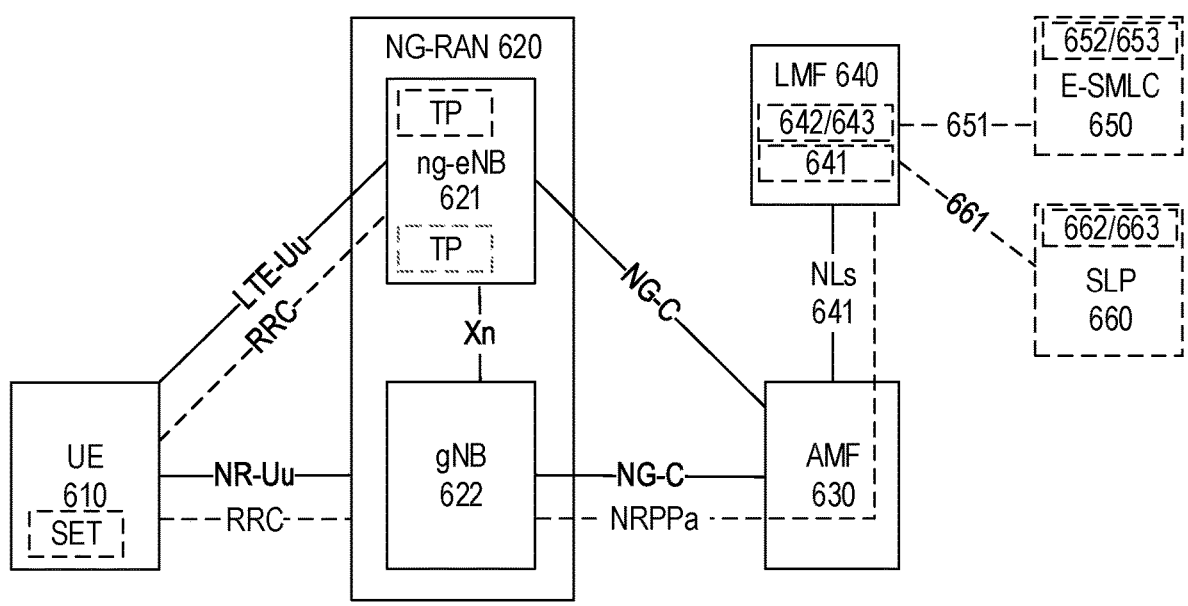
FIG. 6 shows an exemplary positioning architecture for an 5G/NR network.

FIG. 6 is a block diagram illustrating a high-level architecture for supporting UE positioning in NR networks. As shown in FIG. 6, the NG-RAN 620 can include nodes such as gNB 622 and ng-eNB 621, similar to the architecture shown in FIG. 4. Each ng-eNB may control several transmission points (TPs), such as remote radio heads. Moreover, some TPs can be "PRS-only" for supporting positioning reference signal (PRS)-based TBS for E-UTRAN operation.

In addition, the NG-RAN nodes communicate with an AMF 630 in the 5GC via respective NG-C interfaces (both of which may or may not be present), while AMF 630 and LMF 640 communicate via an NLs interface 641. In addition, positioning-related communication between UE 610 and the NG-RAN nodes occurs via the RRC protocol, while positioning-related communication between NG-RAN nodes and LMF occurs via an NRPPa protocol. Optionally, the LMF can also communicate with an E-SMLC 650 and a SUPL 660 in an LTE network via communication interfaces 651 and 661, respectively. Communication interfaces 651 and 661 can utilize and/or be based on standardized protocols, proprietary protocols, or a combination thereof.

LMF 640 can also include, or be associated with, various processing circuitry 642, by which the LMF performs various operations described herein. Processing circuitry 642 can include similar types of processing circuitry as described herein in relation to other network nodes (see, e.g., description of FIG. 13). LMF 640 can also include, or be associated with, a non-transitory computer-readable medium 643 storing instructions (also referred to as a computer program program) that can facilitate the operations of processing circuitry 642. Medium 643 can include similar types of computer memory as described herein in relation to other network nodes (see, e.g., description of FIG. 13). Additionally, LMF 640 can include various communication interface circuitry 641 (e.g., Ethernet, optical, and/or radio transceivers) that can be used, e.g., for communication via the NLs interface. For example, communication interface circuitry 641 can be similar to other interface circuitry described herein in relation to other network nodes (see, e.g., description of FIG. 13).

Similarly, E-SMLC 650 can also include, or be associated with, various processing circuitry 652, by which the E-SMLC performs various operations described herein. Processing circuitry 652 can include similar types of processing circuitry as described herein in relation to other network nodes (see, e.g., description of FIG. 13). E-SMLC 650 can also include, or be associated with, a non-transitory computer-readable medium 653 storing instructions (also referred to as a computer program program) that can facilitate the operations of processing circuitry 652. Medium 653 can include similar types of computer memory as described herein in relation to other network nodes (see, e.g., description of FIG. 13). E-SMLC 650 can also have communication interface circuitry that is appropriate for communicating via interface 651, which can be similar to other interface circuitry described herein in relation to other network nodes (see, e.g., description of FIG. 13).

Similarly, SLP 660 can also include, or be associated with, various processing circuitry 662, by which the SLP performs various operations described herein. Processing circuitry 662 can include similar types of processing circuitry as described herein in relation to other network nodes (see, e.g., description of FIG. 13). SLP 660 can also include, or be associated with, a non-transitory computer-readable medium 663 storing instructions (also referred to as a computer program program) that can facilitate the operations of processing circuitry 662. Medium 663 can include similar types of computer memory as described herein in relation to other network nodes (see, e.g., description of FIG. 13). SLP 660 can also have communication interface circuitry that is appropriate for communicating via interface 651, which can be similar to other interface circuitry described herein in relation to other network nodes (see, e.g., description of FIG. 13).

In a typical operation, the AMF can receive a request for a location service associated with a particular target UE from another entity (e.g., a gateway mobile location center (GMLC)), or the AMF itself can initiate some location service on behalf of a particular target UE (e.g., for an emergency call from the UE). The AMF then sends a location services (LS) request to the LMF. The LMF processes the LS request, which may include transferring assistance data to the target UE to assist with UE-based and/or UE-assisted positioning; and/or positioning of the target UE. The LMF then returns the result of the LS (e.g., a position estimate for the UE and/or an indication of any assistance data transferred to the UE) to the AMF or to another entity (e.g., GMLC) that requested the LS.

An LMF may have a signaling connection to an E-SMLC, enabling the LMF to access information from E-UTRAN, e.g., to support E-UTRA OTDOA positioning using downlink measurements obtained by a target UE. An LMF can also have a signaling connection to an SLP, the LTE entity responsible for user-plane positioning.

Various interfaces and protocols are used for, or involved in, NR positioning. The LTE Positioning Protocol (LPP) is used between a target device (e.g., UE in the control-plane, or SET in the user-plane) and a positioning server (e.g., LMF in the control-plane, SLP in the user-plane). LPP can use either the control- or user-plane protocols as underlying transport. NRPP is terminated between a target device and the LMF. RRC protocol is used between UE and gNB (via NR radio interface) and between UE and ng-eNB (via LTE radio interface).

Furthermore, the NR Positioning Protocol A (NRPPa) carries information between the NG-RAN Node and the LMF and is transparent to the AMF. As such, the AMF routes the NRPPa PDUs transparently (e.g., without knowledge of the involved NRPPa transaction) over NG-C interface based on a Routing ID corresponding to the involved LMF. More specifically, the AMF carries the NRPPa PDUs over NG-C interface either in UE associated mode or non-UE associated mode. The NGAP protocol between the AMF and an NG-RAN node (e.g., gNB or ng-eNB) is used as transport for LPP and NRPPa messages over the NG-C interface. NGAP is also used to instigate and terminate NG-RAN-related positioning procedures.

LPP/NRPP are used to deliver messages such as positioning capability request, OTDOA positioning measurements request, and OTDOA assistance data to the UE from a positioning node (e.g., location server). LPP/NRPP are also used to deliver messages from the UE to the positioning node including, e.g., UE capability, UE measurements for UE-assisted OTDOA positioning, UE request for additional assistance data, UE configuration parameter(s) to be used to create UE-specific OTDOA assistance data, etc. NRPPa is used to deliver the information between ng-eNB/gNB and LMF in both directions. This can include LMF requesting some information from ng-eNB/gNB, and ng-eNB/gNB providing some information to LMF. For example, this can include information about PRS transmitted by ng-eNB/gNB that are to be used for OTDOA positioning measurements by the UE.

NR networks will support positioning methods similar to LTE E-CID, OTDOA, and UTDOA but based on NR measurements. NR may also support one or more of the following position methods:

Multi-RTT: The device (e.g. UE) computes UE Rx-Tx time difference and gNBs compute gNB Rx-Tx time difference. The results are combined to find the UE position based upon round trip time (RTT) calculation.

DL-AoD: gNB or LMF calculates the UE angular position based upon UE DL RSRP measurement results.

UL-AoA: gNB calculates the UL AoA based upon measurements of a UE's UL SRS transmissions.

Each of the NR positioning methods can be supported in UE-assisted, UE-based, or UE-standalone modes, similar to LTE discussed above. For UE-based positioning, a UE needs detailed assistance data including locations of any GNSS satellites and/or RAN nodes that are transmitting the signals being measured by the UE and, in some cases, the angles of beams carrying these signals. A detailed, high-accuracy 3D representation of the location of a transmitting RAN node can require almost 100 bits. Accurate beam angles can require approximately 30 bits per beam. With many network nodes and potentially many beams and frequent provisioning (e.g., via broadcast), the total cost of assistance data provisioning can become considerable.

Even so, a relatively dense network deployment is typical needed to support precise positioning. Some network nodes may be configured with positioning resources in more than one frequency layer, which means that the location information is the same for the node in all these frequency layers. Therefore, if locations for these nodes are provisioned independently in assistance data, there will be significant redundancy and the resulting assistance data will be larger than needed. Although broadcasting assistance data to many UEs is desirable, network broadcast resources are generally very limited. As such, the unnecessary redundancy can inhibit broadcasting of assistance data and require unicast delivery to each UE needing the assistance data. This can reduce the availability of unicast resources for other applications or services, such as eMBB and/or URLLC.

Embodiments of the present disclosure can address these and other issues, problems, and/or difficulties by providing novel techniques for indicating various positioning assistance data (e.g., node locations) relative to other positioning assistance data (e.g., other node locations). For example, a positioning configuration of a second transmitting or receiving node (referred to as TRP) can be indicated by reference to a first TRP. In such case, the configuration of the second TRP is indicated as being the same as the first TRP. As another example, a positioning configuration of a second TRP can be indicated differentially with respect to a first TRP. In such case, the indicated differential configuration for the second TRP can be combined with (e.g., added to) the configuration for the first TRP to determine the actual configuration of the second TRP. In general, "relative to" can include any relationship between the first and second configurations, with by reference to (i.e., the same as) and differential being just two examples.

In this manner, embodiments of the present disclosure can provide various advantages, benefits, and/or solutions to problems. For example, such techniques improve the efficiency of provisioning of positioning assistance data, e.g., by reducing the signaling overhead/cost for individual and/or periodic assistance data provisioning transactions (e.g., unicast or broadcast). Conversely, given a budget or amount of signaling resources available, such techniques can increase the number of individual transactions, the frequency of periodic transactions (e.g., broadcast), and/or the amount of assistance data in each transaction. Such improvements can facilitate better availability of positioning assistance data to UEs, which in turn can facilitate increased use of UE-based positioning for various applications, use cases, and/or scenarios.

In general, for positioning methods involving UE measurements of NR network transmissions, the respective network nodes providing such transmissions (e.g., via beams) are referred to as TRPs. A typical TRP configuration to be provided as assistance data for UE-based positioning includes a static part and a dynamic part. The static part typically includes TRP location information and TRP beam configuration. The dynamic part typically includes a relative time difference (RTD) between the TRP's transmissions and the transmissions of an associated (or reference) TRP, as well as parameters that model drift of the TRP's clock (which can also affect RTD over time).

FIG. 7A shows an ASN.1 data structure for an exemplary nr-TRP-InfoElementR16 information element (IE) that includes configuration information for a TRP, according to various exemplary embodiments of the present disclosure. The nr-TRP-InfoElementR16 IE can be provided to a UE via an RRC message. This IE includes nr-TRP-StaticInfo-r16 field and an nr-TRP-DynamicInfo-r16 field, which respectively include the static and dynamic parts discussed above.

FIG. 7B shows an ASN.1 data structure for an exemplary nr-TRP-StaticInfo-r16 field. In this data structure, the nr-TRP-LocationInfo-r16 field includes the TRP absolute location information (e.g., in 3D) and the nr-PRS-BeamInfo-r16 field includes the TRP beam information. The beam information may be listed in the same order as DL PRS resource sets and resources have been listed, e.g., in nr-PRS-ResourceSetList-r16 field in FIG. 7A. FIG. 7C shows an ASN.1 data structure for an exemplary nr-TRP-DynamicInfo-r16 field. In this data structure, the nr-rtdInfo-r16 field includes the RTD between the TRP and an associated TRP, as discussed above.

Various types of relative representation can be used for the static TRP configuration information shown in FIG. 7B. For example, any of the static configuration information for a second TRP can be same as (or adopted from) corresponding configuration information for a first TRP. When all configuration information is the same, the configuration for the second TRP can be indicated by an identifier associated with the first TRP. For example, each TRP can be associated with an ID such as a configured integer or enumerable, an index in a list, an index pair in a nested list, etc. In this manner, the configuration for the second TRP can be indicated by the TRP ID of the first TRP. In such case, the configuration information for the second TRP can be adopted (e.g., copied) from the configuration information for the associated (i.e., first) TRP, so long as the full configuration information has been provided for the first TRP (e.g., also included in the assistance data).

FIG. 8 shows an ASN.1 data structure for an NR-TRP-StaticInfo-r16 field according to various exemplary embodiments of the present disclosure. In FIG. 8, the field nr-associatedTRP-ID-r16 includes an ID of an associated (or reference) TRP and is only included for TRP configurations indicated completely by reference. In such case, the fields nr-TRP-locationInfo-r16 and nr-prsBeamInfo-r16 are not included, since these parameters are instead adopted (e.g., copied) from the associated TRP's configuration. On the other hand, if nr-associatedTRP-ID-r16 is not included, nr-TRP-locationInfo-r16 and nr-prsBeamInfo-r16 are included.

In other embodiments, some of the static configuration information for a second TRP can be different than corresponding configuration information for a first TRP but can still be indicated relatively by a difference or offset. Such differential embodiments can be particularly useful for 3D location information. Multiple TRPs used for a UE's positioning measurements may be proximate to each other, so that the differences between their locations are much smaller, and can be represented more efficiently, than their absolute locations.

Figures 9, 10:
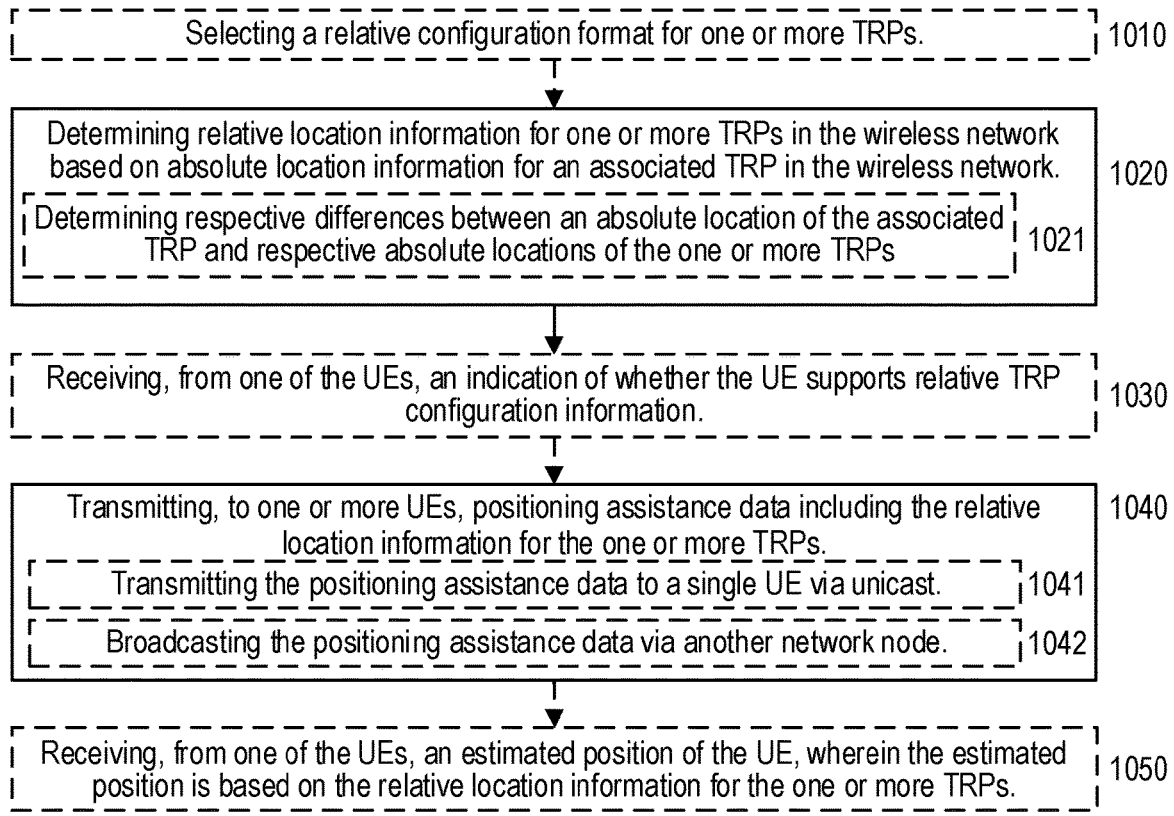

FIG. 9 shows an ASN.1 data structure for an NR-TRP-StaticInfo-r16 field according to these various embodiments of the present disclosure. FIG. 9 includes the fields shown in FIG. 8, as well as a new structure for the nr-TRP-locationInfo-r16 field. This structure provides a choice between including an absolute TRP location (nr-TRP-absLocationInfo-r16) or a relative location (nr-TRP-relLocationInfo-r16). If the relative location is included, the field nr-associatedTRP-ID-r16 is also included and contains an ID of the associated TRP from which the actual location is determined. The absolute location of the TRP is the sum of the relative location and the absolute location of the associated TRP. If the absolute location is included, the field nr-associatedTRP-ID-r16 is not included.

In some embodiments, each provided TRP configuration can include a tag, which can indicate whether the configuration is an absolute configuration, a referential configuration, or a differential configuration. Such a tag can be included in an ASN.1 data structure for a TRP configuration, such as those discussed above. An exemplary tag is given below:

address_tag ENUMERATED {absolute, referential, differential}

Both types of relative configuration representations are capable of reducing the amount of data required to represent TRP configurations, which can improve network signaling as discussed above. Depending upon the particular TRP configuration(s) to be provided, the network may determine that a particular relative configuration representation is more efficient (e.g., requires fewer bits) than other available relative configuration representations. The network can select that scheme and provide the configuration to the UE accordingly.

In some cases where multiple frequency layers are desired/deployed, and each frequency layer includes multiple TRPs, it may be more efficient to use a referential relative configuration. In other cases where only one frequency layer is desired/configured, it may be efficient to use a differential relative configuration. In either case, the network can determine the preferred relative configuration representation, encode the TRP configuration accordingly (e.g., based on FIG. 8 or FIG. 9), and transmit the encoded TRP configuration to one or more UEs. For example, the network can broadcast the encoded TRP configuration to all UEs operating in a cell (e.g., via system information), or the network can provide the encoded TRP configuration individually to one or more UEs via dedicated signaling.

Figure 11:
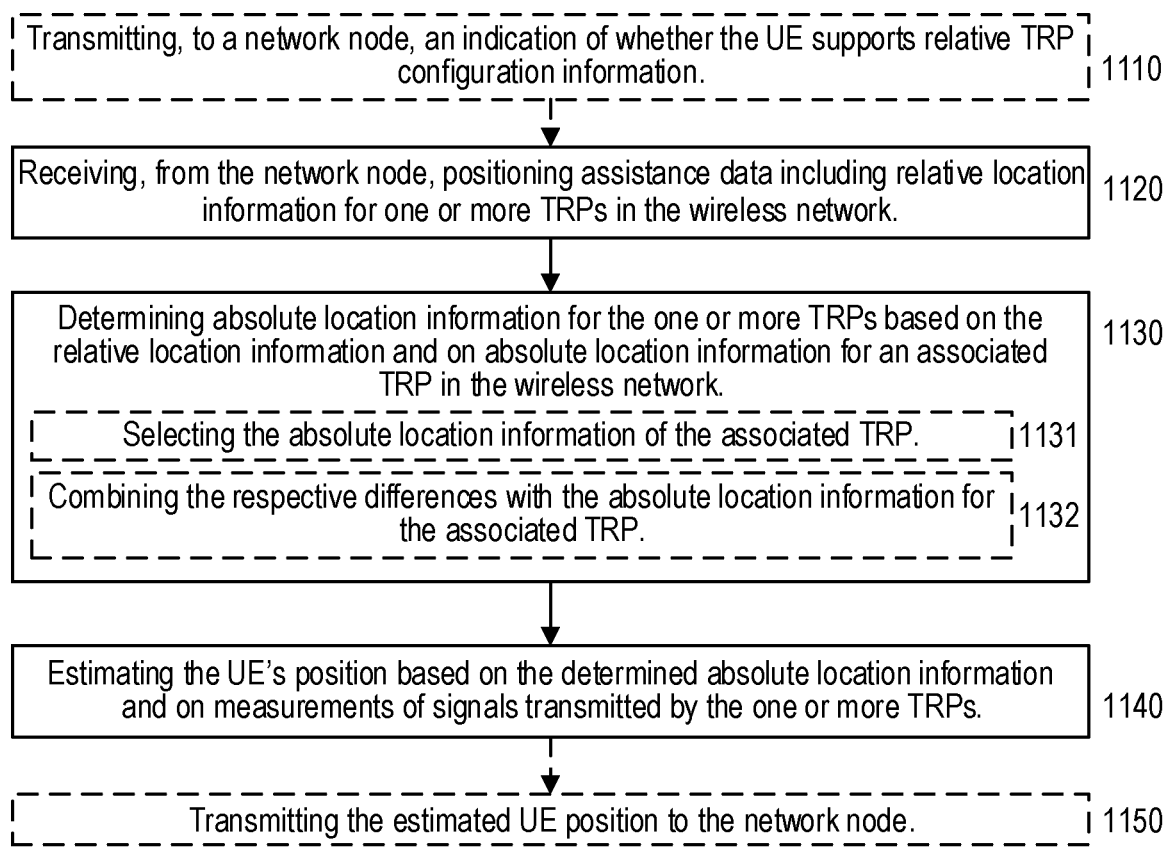
FIG. 11 is a flow diagram of an exemplary method (e.g., procedure) for a UE (e.g., wireless device), according to various exemplary embodiments of the present disclosure.

The embodiments described above can be further illustrated with reference to FIGS. 10-11, which depict exemplary methods (e.g., procedures) that can be performed by a network node and a UE, respectively. Put differently, various features of the operations described below correspond to various embodiments described above. Furthermore, the exemplary methods shown in FIGS. 10-11 can be used cooperatively to provide various benefits, advantages, and/or solutions to problems, including those described herein. Although FIGS. 10-11 show specific blocks in particular orders, the operations of the exemplary methods can be performed in different orders than shown and can be combined and/or divided into blocks having different functionality than shown. Optional blocks or operations are indicated by dashed lines.

In particular, FIG. 10 shows a flow diagram of an exemplary method (e.g., procedure) for providing positioning assistance data to one or more user equipment (UEs) in a wireless network, according to various exemplary embodiments of the present disclosure. The exemplary method can be performed by a network node or function (e.g., E-SMLC, SLP, LMF, base station, eNB, gNB, ng-eNB, etc., or component thereof) in or associated with the wireless network. For example, the exemplary method shown in FIG. 10 can be implemented in a network node or function configured according to other figures described herein.

The exemplary method can include the operations of block 1020, where the network node can determine relative location information for one or more TRPs in the wireless network based on absolute location information for an associated TRP in the wireless network. The exemplary method can also include the operations of block 1040, where the network node can transmit, to one or more UEs, positioning assistance data including the relative location information for the one or more TRPs. In some embodiments, the positioning assistance data can also include the absolute location information for the associated TRP.

In some embodiments, the relative configuration information for the one or more TRPs can include an identifier of the associated TRP. In such embodiments, the identifier (i.e., of the associated TRP) indicates that the absolute configuration information for the one or more TRPs is adopted from (e.g., the same as) the absolute location information for the associated TRP. These embodiments correspond to the referential format discussed above.

In other of these embodiments, the determining operations in block 1020 can include the operations of sub-block 1021, where the network node can determine respective differences (e.g., offsets) between an absolute location of the associated TRP and respective absolute locations of the one or more TRPs. In such embodiments, the relative location information can include the determined differences and an identifier of the associated TRP. These embodiments correspond to the differential format discussed above.

In some embodiments, the exemplary method can also include the operations of block 1010, where the network node can select a relative configuration format, for the one or more TRPs, from a plurality of available relative configuration formats. In such embodiments, determining the relative configuration information (e.g., in block 1020) can be based on the preferred relative configuration format. Furthermore, the transmitted positioning assistance data (e.g., in block 1020) can include an indicator of the selected relative configuration format.

In some of these embodiments, the available relative configuration formats can include a referential format based on an identifier of an associated TRP, and a differential format based on the identifier of the associated TRP and differences of one or more configuration parameters from reference parameters of the associated TRP. For example, these two available relative configuration formats can correspond to referential and differential formats described above in relation to FIGS. 8-9.

In some embodiments, the transmitting operations in block 1040 can include the operations of sub-block 1041, where the network node can transmit the positioning assistance data to a single UE via unicast. In other embodiments, the transmitting operations in block 1040 can include the operations of sub-block 1042, where the network node can broadcast, via another network node, the positioning assistance data in at least one cell of the wireless network. For example, if the network node is a positioning node (e.g., E-SMLC, LMF), the network node can provide the positioning assistance data to a base station (e.g., eNB, gNB) for broadcasting as SI in one of more cells served by the base station.

In some embodiments, the exemplary method can also include the operations of block 1030, where the network node can receive, from a UE, an indication of whether the UE supports relative TRP configuration information. In such embodiments, the positioning assistance data transmitted to the UE can include the relative location information for the one or more TRPs only when the indication indicates that the UE supports relative TRP configuration information. In some embodiments, the positioning assistance data transmitted to the UE can include absolute location information for the one or more TRPs when the indication indicates that the UE does not support relative TRP configuration information.

In some embodiments, the exemplary method can also include the operations of block 1050, where the network node can receive, from one of the UEs, an estimated position of the UE. The estimated position can be based on the relative location information for the one or more TRPs (e.g., in the positioning assistance data), which was determined based on the absolute location information for the associated TRP. The estimated position can also be based on measurements of signals transmitted or received by the one or more TRPs and, in some cases, on measurements of signals transmitted or received by the associated TRP.

In addition, FIG. 11 shows a flow diagram of an exemplary method (e.g., procedure) for positioning in a wireless network, according to various exemplary embodiments of the present disclosure. The exemplary method can be performed by a UE (e.g., wireless device, MTC device, NB-IoT device, modem, etc. or component thereof), such as UEs configured according to other figures described herein.

The exemplary method can include the operations of block 1120, where the UE can receive, from a network node (e.g., E-SMLC, LMF, etc.), positioning assistance data including relative location information for one or more TRPs in the wireless network. The exemplary method can also include the operations of block 1130, where the UE can determine absolute location information for the one or more TRPs based on the relative location information and absolute location information for an associated (e.g., reference) TRP in the wireless network. The exemplary method can also include the operations of block 1140, where the UE can estimate the UE's (i.e., its own) position based on the determined absolute location information and measurements of signals transmitted or received by the one or more TRPs. In some embodiments, the estimated position can also be based on measurements of signals transmitted or received by the associated TRP.

In some embodiments, the relative configuration information for the one or more TRPs can include an identifier of the associated TRP. In such embodiments, the identifier indicates that the absolute configuration information for the one or more TRPs is adopted from (e.g., the same as) the absolute location information for the associated TRP. In such embodiments, determining the absolute location information for the one or more TRPs in block 1130 can include the operations of sub-block 1131, where the UE can select the absolute location information for the associated TRP. These embodiments correspond to the referential format discussed above.

In other of these embodiments, the identifier indicates that the absolute location information for the one or more TRPs is differential to the absolute location information for the associated TRP. In such embodiments, the relative location information can include respective differences (e.g., offsets) between an absolute location of the associated TRP and respective absolute locations of the one or more TRPs. In such embodiments, determining the absolute location information for the one or more TRPs in block 1130 can include the operations of sub-block 1132, where the UE can combine the respective differences with the absolute location information for the associated TRP. These embodiments correspond to the differential format discussed above.

In some embodiments, the positioning assistance data can also include an indicator of a relative configuration format for the relative location information. In such embodiments, determining the absolute location information (e.g., in block 1130) is based on the indicated relative configuration format. For example, the indicated relative configuration format can be one of a plurality of available relative configuration formats that include a referential format based on an identifier of an associated TRP, and a differential format based on the identifier of the associated TRP and differences of one or more configuration parameters from reference parameters of the associated TRP. For example, these two available relative configuration formats can correspond to referential and differential formats described above in relation to FIGS. 8-9.

In various embodiments, the positioning assistance data can be received as unicast from the network node, or as broadcast in a cell of the wireless network.

In some embodiments, the exemplary method can also include the operations of block 1110, where the UE can transmit, to the network node, an indication of whether the UE supports relative TRP configuration information. In such embodiments, the received positioning assistance can include the relative location information for the one or more TRPs only when the indication indicates that the UE supports relative TRP configuration information. In some embodiments, the received positioning assistance data can include absolute location information for the one or more TRPs when the indication indicates that the UE does not support relative TRP configuration information.

In some embodiments, the exemplary method can also include the operations of block 1150, where the UE can transmit the estimated UE position to the network node.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 12:
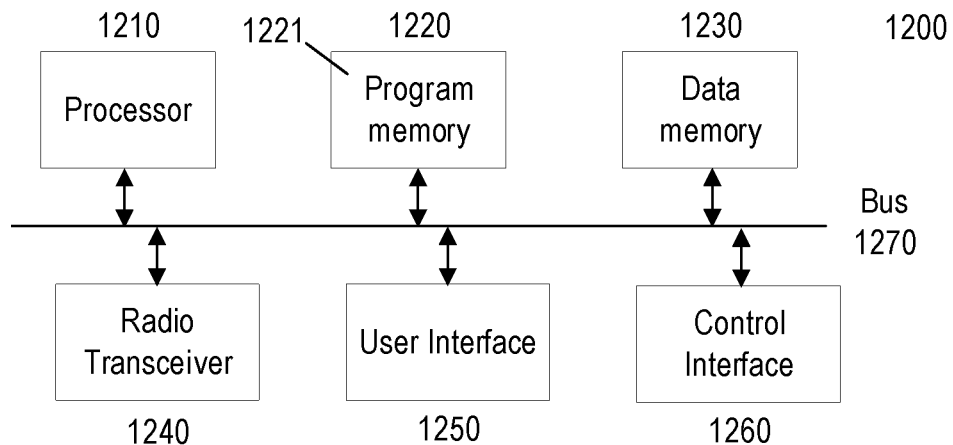
FIG. 12 is a block diagram of an exemplary wireless device or UE according to various exemplary embodiments of the present disclosure.

FIG. 12 shows a block diagram of an exemplary wireless device or user equipment (UE) 1200 (hereinafter referred to as "UE 1200") according to various embodiments of the present disclosure, including those described above with reference to other figures. For example, UE 1200 can be configured by execution of instructions, stored on a computer-readable medium, to perform operations corresponding to one or more of the exemplary methods described herein.

UE 1200 can include a processor 1210 (also referred to as "processing circuitry") that can be operably connected to a program memory 1220 and/or a data memory 1230 via a bus 1270 that can comprise parallel address and data buses, serial ports, or other methods and/or structures known to those of ordinary skill in the art. Program memory 1220 can store software code, programs, and/or instructions (collectively shown as computer program product 1221 in FIG. 12) that, when executed by processor 1210, can configure and/or facilitate UE 1200 to perform various operations, including operations corresponding to various exemplary methods described herein. As part of or in addition to such operations, execution of such instructions can configure and/or facilitate UE 1200 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1240, user interface 1250, and/or control interface 1260.

As another example, processor 1210 can execute program code stored in program memory 1220 that corresponds to MAC, RLC, PDCP, and RRC layer protocols standardized by 3GPP (e.g., for NR and/or LTE). As a further example, processor 1210 can execute program code stored in program memory 1220 that, together with radio transceiver 1240, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1210 can execute program code stored in program memory 1220 that, together with radio transceiver 1240, implements device-to-device (D2D) communications with other compatible devices and/or UEs.

Program memory 1220 can also include software code executed by processor 1210 to control the functions of UE 1200, including configuring and controlling various components such as radio transceiver 1240, user interface 1250, and/or control interface 1260. Program memory 1220 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1220 can comprise an external storage arrangement (not shown) remote from UE 1200, from which the instructions can be downloaded into program memory 1220 located within or removably coupled to UE 1200, so as to enable execution of such instructions.

Data memory 1230 can include memory area for processor 1210 to store variables used in protocols, configuration, control, and other functions of UE 1200, including operations corresponding to, or comprising, any of the exemplary methods described herein. Moreover, program memory 1220 and/or data memory 1230 can include non-volatile memory (e.g., flash memory), volatile memory (e.g., static or dynamic RAM), or a combination thereof. Furthermore, data memory 1230 can comprise a memory slot by which removable memory cards in one or more formats (e.g., SD Card, Memory Stick, Compact Flash, etc.) can be inserted and removed.

Persons of ordinary skill will recognize that processor 1210 can include multiple individual processors (including, e.g., multi-core processors), each of which implements a portion of the functionality described above. In such cases, multiple individual processors can be commonly connected to program memory 1220 and data memory 1230 or individually connected to multiple individual program memories and or data memories. More generally, persons of ordinary skill in the art will recognize that various protocols and other functions of UE 1200 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1240 can include radio-frequency transmitter and/or receiver functionality that facilitates the UE 1200 to communicate with other equipment supporting like wireless communication standards and/or protocols. In some exemplary embodiments, the radio transceiver 1240 includes one or more transmitters and one or more receivers that enable UE 1200 to communicate according to various protocols and/or methods proposed for standardization by 3GPP and/or other standards-setting organizations (SSOs). For example, such functionality can operate cooperatively with processor 1210 to implement a PHY layer based on OFDM, OFDMA, and/or SC-FDMA technologies, such as described herein with respect to other figures.

In some exemplary embodiments, radio transceiver 1240 includes one or more transmitters and one or more receivers that can facilitate the UE 1200 to communicate with various LTE, LTE-Advanced (LTE-A), and/or NR networks according to standards promulgated by 3GPP. In some exemplary embodiments of the present disclosure, the radio transceiver 1240 includes circuitry, firmware, etc. necessary for the UE 1200 to communicate with various NR, NR-U, LTE, LTE-A, LTE-LAA, UMTS, and/or GSM/EDGE networks, also according to 3GPP standards. In some embodiments, radio transceiver 1240 can include circuitry supporting D2D communications between UE 1200 and other compatible devices.

In some embodiments, radio transceiver 1240 includes circuitry, firmware, etc. necessary for the UE 1200 to communicate with various CDMA2000 networks, according to 3GPP2 standards. In some embodiments, the radio transceiver 1240 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1240 can include a transceiver that is capable of wired communication, such as by using IEEE 802.3 Ethernet technology. The functionality particular to each of these embodiments can be coupled with and/or controlled by other circuitry in the UE 1200, such as the processor 1210 executing program code stored in program memory 1220 in conjunction with, and/or supported by, data memory 1230.

User interface 1250 can take various forms depending on the particular embodiment of UE 1200, or can be absent from UE 1200 entirely. In some embodiments, user interface 1250 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1200 can comprise a tablet computing device including a larger touchscreen display. In such embodiments, one or more of the mechanical features of the user interface 1250 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1200 can be a digital computing device, such as a laptop computer, desktop computer, workstation, etc. that comprises a mechanical keyboard that can be integrated, detached, or detachable depending on the particular embodiment. Such a digital computing device can also comprise a touch screen display. Many exemplary embodiments of the UE 1200 having a touch screen display are capable of receiving user inputs, such as inputs related to exemplary methods described herein or otherwise known to persons of ordinary skill.

In some embodiments, UE 1200 can include an orientation sensor, which can be used in various ways by features and functions of UE 1200. For example, the UE 1200 can use outputs of the orientation sensor to determine when a user has changed the physical orientation of the UE 1200's touch screen display. An indication signal from the orientation sensor can be available to any application program executing on the UE 1200, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1260 of the UE 1200 can take various forms depending on the particular exemplary embodiment of UE 1200 and of the particular interface requirements of other devices that the UE 1200 is intended to communicate with and/or control. For example, the control interface 1260 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some exemplary embodiments of the present disclosure, the control interface 1260 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1200 can comprise more functionality than is shown in FIG. 12 including, for example, a video and/or still-image camera, microphone, media player and/or recorder, etc. Moreover, radio transceiver 1240 can include circuitry necessary to communicate using additional radio-frequency communication standards including Bluetooth, GPS, and/or others. Moreover, the processor 1210 can execute software code stored in the program memory 1220 to control such additional functionality. For example, directional velocity and/or position estimates output from a GPS receiver can be available to any application program executing on the UE 1200, including any program code corresponding to and/or embodying any exemplary embodiments (e.g., of methods) described herein.

Figure 13:
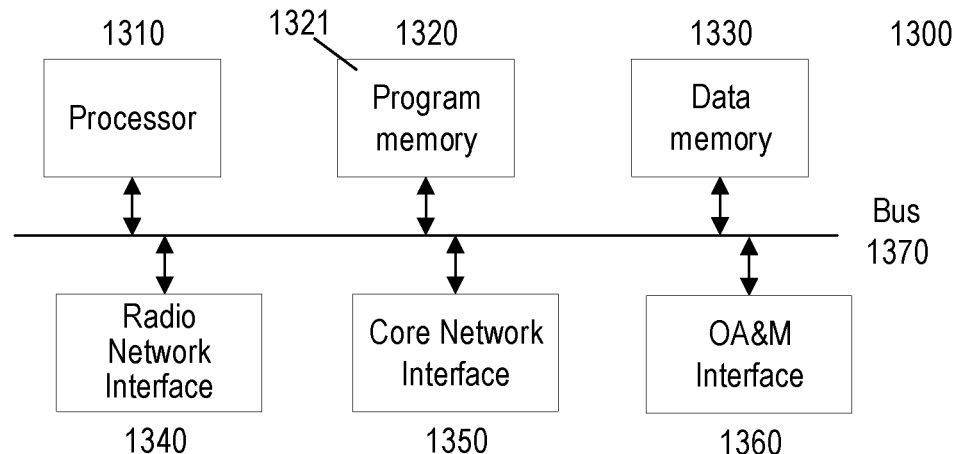
FIG. 13 is a block diagram of an exemplary network node according to various exemplary embodiments of the present disclosure.

FIG. 13 shows a block diagram of an exemplary network node 1300 according to various embodiments of the present disclosure, including those described above with reference to other figures. For example, exemplary network node 1300 can be configured by execution of instructions, stored on a computer-readable medium, to perform operations corresponding to one or more of the exemplary methods described herein. In some exemplary embodiments, network node 1300 can comprise a base station, eNB, gNB, or one or more components thereof. For example, network node 1300 can be configured as a central unit (CU) and one or more distributed units (DUs) according to NR gNB architectures specified by 3GPP. More generally, the functionally of network node 1300 can be distributed across various physical devices and/or functional units, modules, etc.

Network node 1300 can include processor 1310 (also referred to as "processing circuitry") that is operably connected to program memory 1320 and data memory 1330 via bus 1370, which can include parallel address and data buses, serial ports, or other methods and/or structures known to those of ordinary skill in the art.

Program memory 1320 can store software code, programs, and/or instructions (collectively shown as computer program product 1321 in FIG. 13) that, when executed by processor 1310, can configure and/or facilitate network node 1300 to perform various operations, including operations corresponding to various exemplary methods described herein. As part of and/or in addition to such operations, program memory 1320 can also include software code executed by processor 1310 that can configure and/or facilitate network node 1300 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1340 and/or core network interface 1350. By way of example, core network interface 1350 can comprise the S1 or NG interface and radio network interface 1340 can comprise the Uu interface, as standardized by 3GPP. Program memory 1320 can also comprise software code executed by processor 1310 to control the functions of network node 1300, including configuring and controlling various components such as radio network interface 1340 and core network interface 1350.

Data memory 1330 can comprise memory area for processor 1310 to store variables used in protocols, configuration, control, and other functions of network node 1300. As such, program memory 1320 and data memory 1330 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1310 can include multiple individual processors (not shown), each of which implements a portion of the functionality described above. In such case, multiple individual processors may be commonly connected to program memory 1320 and data memory 1330 or individually connected to multiple individual program memories and/or data memories. More generally, persons of ordinary skill will recognize that various protocols and other functions of network node 1300 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1340 can comprise transmitters, receivers, signal processors, ASICs, antennas, beamforming units, and other circuitry that enables network node 1300 to communicate with other equipment such as, in some embodiments, a plurality of compatible user equipment (UE). In some embodiments, interface 1340 can also enable network node 1300 to communicate with compatible satellites of a satellite communication network. In some exemplary embodiments, radio network interface 1340 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1340. According to further exemplary embodiments of the present disclosure, the radio network interface 1340 can comprise a PHY layer based on OFDM, OFDMA, and/or SC-FDMA technologies. In some embodiments, the functionality of such a PHY layer can be provided cooperatively by radio network interface 1340 and processor 1310 (including program code in memory 1320).

Core network interface 1350 can comprise transmitters, receivers, and other circuitry that enables network node 1300 to communicate with other equipment in a core network such as, in some embodiments, circuit-switched (CS) and/or packet-switched Core (PS) networks. In some embodiments, core network interface 1350 can comprise the S1 interface standardized by 3GPP. In some embodiments, core network interface 1350 can comprise the NG interface standardized by 3GPP. In some exemplary embodiments, core network interface 1350 can comprise one or more interfaces to one or more AMFs, SMFs, SGWs, MMES, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1350 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1300 can include hardware and/or software that configures and/or facilitates network node 1300 to communicate with other network nodes in a RAN (also referred to as a "wireless network"), such as with other eNBs, gNBs, ng-eNBs, en-gNBs, IAB nodes, etc. Such hardware and/or software can be part of radio network interface 1340 and/or core network interface 1350, or it can be a separate functional unit (not shown). For example, such hardware and/or software can configure and/or facilitate network node 1300 to communicate with other RAN nodes via the X2 or Xn interfaces, as standardized by 3GPP.

OA&M interface 1360 can comprise transmitters, receivers, and other circuitry that enables network node 1300 to communicate with external networks, computers, databases, and the like for purposes of operations, administration, and maintenance of network node 1300 or other network equipment operably connected thereto. Lower layers of OA&M interface 1360 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1340, core network interface 1350, and OA&M interface 1360 may be multiplexed together on a single physical interface, such as the examples listed above.

Figure 14:
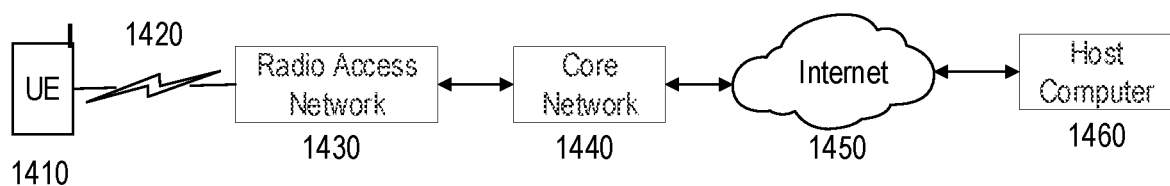
FIG. 14 is a block diagram of an exemplary network configured to provide over-the-top (OTT) data services between a host computer and a UE, according to various exemplary embodiments of the present disclosure.

FIG. 14 is a block diagram of an exemplary communication network configured to provide over-the-top (OTT) data services between a host computer and a user equipment (UE), according to various exemplary embodiments of the present disclosure. UE 1410 can communicate with radio access network (RAN, also referred to as "wireless network") 1430 over radio interface 1420, which can be based on protocols described above including, e.g., LTE, LTE-A, and 5G/NR. For example, UE 1410 can be configured and/or arranged as shown in other figures discussed above.

RAN 1430 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1430 can cooperatively operate using licensed and unlicensed spectrum. In some embodiments, RAN 1430 can include, or be capable of communication with, one or more satellites comprising a satellite access network.

RAN 1430 can further communicate with core network 1440 according to various protocols and interfaces described above. For example, one or more apparatus (e.g., base stations, eNBs, gNBs, etc.) comprising RAN 1430 can communicate to core network 1440 via core network interface 1450 described above. In some exemplary embodiments, RAN 1430 and core network 1440 can be configured and/or arranged as shown in other figures discussed above. For example, eNBs comprising an E-UTRAN 1430 can communicate with an EPC core network 1440 via an S1 interface. As another example, gNBs and ng-eNBs comprising an NG-RAN 1430 can communicate with a 5GC core network 1430 via an NG interface.

Core network 1440 can further communicate with an external packet data network, illustrated in FIG. 14 as Internet 1450, according to various protocols and interfaces known to persons of ordinary skill in the art. Many other devices and/or networks can also connect to and communicate via Internet 1450, such as exemplary host computer 1460. In some exemplary embodiments, host computer 1460 can communicate with UE 1410 using Internet 1450, core network 1440, and RAN 1430 as intermediaries. Host computer 1460 can be a server (e.g., an application server) under ownership and/or control of a service provider. Host computer 1460 can be operated by the OTT service provider or by another entity on the service provider's behalf.

For example, host computer 1460 can provide an over-the-top (OTT) packet data service to UE 1410 using facilities of core network 1440 and RAN 1430, which can be unaware of the routing of an outgoing/incoming communication to/from host computer 1460. Similarly, host computer 1460 can be unaware of routing of a transmission from the host computer to the UE, e.g., the routing of the transmission through RAN 1430. Various OTT services can be provided using the exemplary configuration shown in FIG. 14 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 14 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide novel techniques for providing positioning assistance information that facilitate UE-based estimates of position, e.g., based on measurements of signals transmitted or received by TRPs in the wireless network. Such techniques can facilitate more accurate and/or more timely location estimates by UEs, as well as reduced network signaling complexity, as described above. Such advantages can be very important in certain applications, such as high-precision/high-accuracy positioning and/or low-complexity positioning. When used in NR UEs (e.g., UE 1410) and gNBs (e.g., gNBs comprising RAN 1430), exemplary embodiments described herein can provide various improvements, benefits, and/or advantages that facilitate the use of location-based OTT services. As a consequence, this improves the performance of these services as experienced by OTT service providers and end-users, including more precise delivery of services with lower latency without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

E1. A method, performed by a network node in a wireless network, for providing positioning assistance data to one or more user equipment (UEs), the method comprising:

based on absolute configuration information for a reference transmission reception point (TRP), determining relative configuration information for one or more TRPs; and transmitting, to one or more UEs, positioning assistance data including the relative configuration information for the one or more TRPs.

E2. The method of embodiment E1, wherein determining the relative configuration information comprises selecting the reference TRP.

E3. The method of embodiment E2, wherein the relative configuration information for the one or more TRPs includes an identifier of the reference TRP.

E4. The method of any of embodiment E3, wherein the identifier indicates that the absolute configuration information for the one or more TRPs is the same as the absolute configuration information for the reference TRP.

E5. The method of embodiment E2, wherein:
 determining the relative configuration further comprises, for each of the one or more TRPs, determining differences between one or more configuration parameters and corresponding reference parameters of the reference TRP; and
 the relative configuration information includes the determined differences and an identifier of the reference TRP.

E6. The method of any of embodiments E1-E5, further comprising selecting a preferred relative configuration format, for the one or more TRPs, from among a plurality of available relative configuration formats, wherein determining the relative configuration information is based on the preferred relative configuration format.

E7. The method of embodiment E6, wherein the available relative configuration formats include the following:
 a referential format based on an identifier of a reference TRP; and
 a differential format based on the identifier of the reference TRP and differences of one or more configuration parameters from reference parameters of the reference TRP.

E8. The method of any of embodiments E1-E7, wherein transmitting the positioning assistance data to one or more UEs includes one of the following:
 transmitting the positioning assistance data to a single UE via unicast; or
 broadcasting, via another network node, the positioning assistance data in at least one cell of the wireless network.

E9. The method of embodiment E8, wherein:
 the method further comprises receiving, from a UE, an indication of whether the UE supports relative TRP configuration information;
 the positioning assistance data, including the relative configuration information for the one or more TRPs, is transmitted via unicast to the UE based on the indication indicating that the UE supports relative TRP configuration information.

E10. The method of any of embodiments E1-E9, further comprising receiving, from the UE, an estimated position of the UE, wherein the estimated position is based on the relative configuration information for the one or more TRPs.

E11. A method, performed by user equipment (UE), for receiving positioning assistance data from a network node in a wireless network, the method comprising:
 receiving, from a network node, positioning assistance data including a relative configuration information for one or more transmission reception points (TRPs);
 determining absolute configuration information for the one or more TRPs; and
 estimating the UE's position based on the absolute configuration information and measurements of signals transmitted or received by the one or more TRPs.

E12. The method of embodiment E11, wherein the relative configuration information for the one or more TRPs includes an identifier of the reference TRP.

E13. The method of embodiment E12, wherein:
 the identifier indicates that the absolute configuration information for the one or more TRPs is the same as the absolute configuration information for the reference TRP; and
 determining the absolute configuration information for the one or more TRPs comprises selecting the absolute configuration information for the reference TRP.

E14. The method of embodiment E12, wherein:
 the identifier indicates that the absolute configuration information for the one or more TRPs is differential to the absolute configuration information for the reference TRP; and
 the relative configuration information for the one or more TRPs also includes differences between one or more configuration parameters and corresponding reference parameters of the reference TRP.

E15. The method of embodiment E14, wherein determining the absolute configuration information for the one or more TRPs comprises combining the relative configuration information with the absolute configuration information for the reference TRP.

E16. The method of any of embodiments E11-E15, wherein:
 the relative configuration information includes a configuration format indicator;
 the configuration format indicator indicates one of a plurality of available relative configuration formats; and
 determining the absolute configuration information is based on the indicated configuration format.

E17. The method of embodiment E16, wherein the available relative configuration formats include the following:
 a referential format based on an identifier of a reference TRP; and
 a differential format based on the identifier of the reference TRP and differences of one or more configuration parameters from reference parameters of the reference TRP.

E18. The method of any of embodiments E11-E17, wherein the positioning assistance data is received according to one of the following:
 unicast from the network node; or
 broadcast in a cell of the wireless network.

E19. The method of embodiment E18, wherein:
 the method further comprises transmitting, to the network node, an indication of whether the UE supports relative TRP configuration information; and
 the positioning assistance data, including the relative configuration information for the one or more TRPs, is received via unicast from the network node based on the indication indicating that the UE supports relative TRP configuration information.

E20. The method of any of embodiments E11-E19, further comprising transmitting, to the network node, the estimated UE position.

E21. A network node, in a wireless network, configured to provide positioning assistance data to one or more user equipment (UEs), the network node comprising:
 a communication interface configured to communicate with the UEs via one or more further nodes in the wireless network; and
 processing circuitry operatively coupled to the communication interface, whereby the processing circuitry and the communication interface are configured to perform operations corresponding to any of the methods of embodiments E1-E10.

E22. A network node, in a wireless network, configured to provide positioning assistance data to one or more user equipment (UEs), the network node being further arranged to perform operations corresponding to any of the methods of embodiments E1-E10.

E23. A non-transitory, computer-readable medium storing computer-executable instructions that, when executed by processing circuitry of a network node, in a wireless network, configured to provide positioning assistance data to one or more user equipment (UEs), configure the network node to perform operations corresponding to any of the methods of embodiments E1-E10.

E24. A computer program product comprising computer-executable instructions that, when executed by processing circuitry of a network node, in a wireless network, configured to provide positioning assistance data to one or more user equipment (UEs), configure the network node to perform operations corresponding to any of the methods of embodiments E1-E10.

E25. A user equipment (UE) configured to receive positioning assistance data from a network node in a wireless network, the UE comprising:
   radio transceiver circuitry configured to communicate with the network node via one or more further nodes in the wireless network; and
   processing circuitry operatively coupled to the radio transceiver circuitry, whereby the processing circuitry and the radio transceiver circuitry are configured to perform operations corresponding to any of the methods of embodiments E11-E20.

E26. A user equipment (UE) configured to receive positioning assistance data from a network node in a wireless network, the UE being further arranged to perform operations corresponding to any of the methods of embodiments E11-E20.

E27. A non-transitory, computer-readable medium storing computer-executable instructions that, when executed by processing circuitry of a user equipment (UE) configured to receive positioning assistance data from a network node in a wireless network, configure the UE to perform operations corresponding to any of the methods of embodiments E11-E20.

E28. A computer program product comprising computer-executable instructions that, when executed by processing circuitry of a user equipment (UE) configured to receive positioning assistance data from a network node in a wireless network, configure the UE to perform operations corresponding to any of the methods of embodiments E11-E20.

The invention claimed is:

1. A method, performed by a network node, for providing positioning assistance data to one or more user equipment (UEs) in a wireless network, the method comprising:
   determining relative location information for one or more transmission reception points (TRPs) in the wireless network based on absolute location information for an associated TRP in the wireless network; and
   transmitting, to one or more UEs, positioning assistance data including the relative location information for the one or more TRPs, wherein:
   the relative location information for the one or more TRPs includes an identifier of the associated TRP; and
   the identifier indicates that the absolute location information for the one or more TRPs is adopted from the absolute location information for the associated TRP.

2. The method of claim 1, wherein:
   the method further comprises selecting a relative configuration format, for the one or more TRPs, from among a plurality of available relative configuration formats;
   determining the relative location information is based on the selected relative configuration format; and
   the positioning assistance data includes an indicator of the selected relative configuration format.

3. The method of claim 2, wherein the plurality of available relative configuration formats include:
   a referential format based on an identifier of an associated TRP; and
   a differential format based on the identifier of the associated TRP and differences of one or more configuration parameters from corresponding reference parameters of the associated TRP.

4. The method of claim 1, wherein transmitting the positioning assistance data to one or more UEs includes one of the following:
   transmitting the positioning assistance data to a single UE via unicast; or
   broadcasting, via another network node, the positioning assistance data in at least one cell of the wireless network.

5. The method of claim 1, wherein:
   the method further comprises receiving, from one of the UEs, an indication of whether the UE supports relative TRP configuration information; and
   the positioning assistance data transmitted to the UE includes the relative location information for the one or more TRPs only when the indication indicates that the UE supports relative TRP configuration information.

6. The method of claim 5, wherein the positioning assistance data transmitted to the UE includes absolute location information for the one or more TRPs when the indication indicates that the UE does not support relative TRP configuration information.

7. The method of claim 1, further comprising receiving, from one of the UEs, an estimated position of the UE, wherein the estimated position is based on the relative location information for the one or more TRPs.

8. The method of claim 1, wherein the positioning assistance data also includes the absolute location information for the associated TRP.

9. A method, performed by user equipment (UE), for receiving positioning assistance data in a wireless network, the method comprising:
   receiving, from a network node, positioning assistance data including relative location information for one or more transmission reception points (TRPs) in the wireless network;
   determining absolute location information for the one or more TRPs based on the relative location information and on absolute location information for an associated TRP in the wireless network; and
   estimating the UE's position based on the determined absolute location information and on measurements of signals transmitted or received by the one or more TRPs,
   wherein:
   the relative location information for the one or more TRPs includes an identifier of the associated TRP; and
   the identifier indicates that the absolute location information for the one or more TRPs is adopted from the absolute location information for the associated TRP.

10. The method of claim 9, wherein determining the absolute location information for the one or more TRPs comprises selecting the absolute location information for the associated TRP.

11. The method of claim 9, wherein:
the positioning assistance data also includes an indicator of a relative configuration format for the relative location information; and
determining the absolute location information is based on the indicated relative configuration format.

12. The method of claim 11, wherein the indicated relative configuration format is one of a plurality of available relative configuration formats that include:
a referential format based on an identifier of an associated TRP; and
a differential format based on the identifier of the associated TRP and differences of one or more configuration parameters from corresponding reference parameters of the associated TRP.

13. The method of claim 9, wherein the positioning assistance data is received according to one of the following:
unicast from the network node; or
broadcast in a cell of the wireless network.

14. The method of claim 9, wherein:
the method further comprises transmitting, to the network node, an indication of whether the UE supports relative TRP configuration information; and
the received positioning assistance data includes the relative location information for the one or more TRPs only when the indication indicates that the UE supports relative TRP configuration information.

15. The method of claim 14, wherein the received positioning assistance data includes absolute location information for the one or more TRPs when the indication indicates that the UE does not support relative TRP configuration information.

16. The method of claim 9, further comprising transmitting the estimated UE position to the network node.

17. The method of claim 9, wherein the positioning assistance data also includes the absolute location information for the associated TRP.

18. A network node configured to provide positioning assistance data to one or more user equipment (UEs) in a wireless network, the network node comprising:
communication interface circuitry configured to communicate with the UEs via the wireless network; and
processing circuitry operatively coupled to the communication interface circuitry, whereby the processing circuitry and the communication interface circuitry are configured to:
determine relative location information for one or more transmission reception points (TRPs) in the wireless network based on absolute location information for an associated TRP in the wireless network; and
transmit, to one or more UEs, positioning assistance data including the relative location information for the one or more TRPs, wherein:
the relative location information for the one or more TRPs includes an identifier of the associated TRP; and
the identifier indicates that the absolute location information for the one or more TRPs is adopted from the absolute location information for the associated TRP.

19. A user equipment (UE) configured for positioning in a wireless network, the UE comprising:
radio transceiver circuitry configured to communicate with a network node via the wireless network; and
processing circuitry operatively coupled to the radio transceiver circuitry, whereby the processing circuitry and the radio transceiver circuitry are configured to perform operations corresponding to the method of claim 9.

* * * * *